US006340512B1

(12) United States Patent
Mercer et al.

(10) Patent No.: US 6,340,512 B1
(45) Date of Patent: Jan. 22, 2002

(54) INTEGRATED CARD FORM WITH INTERMITTENT SECUREMENT

(75) Inventors: Merl Mercer; Kevin L. Marquardt; Jesse D. Crum, all of Fort Scott, KS (US)

(73) Assignee: Ward/Kraft, Inc., Fort Scott, KS (US)

( * ) Notice: Subject to any disclaimer, the term of this patent is extended or adjusted under 35 U.S.C. 154(b) by 0 days.

(21) Appl. No.: 09/620,828

(22) Filed: Jul. 21, 2000

(51) Int. Cl.[7] .................................................. B32B 7/06

(52) U.S. Cl. .......................... 428/42.2; 428/61; 428/67; 428/40.1

(58) Field of Search ........................ 428/42.2, 67, 40.1, 428/43, 61; 283/81

(56) References Cited

U.S. PATENT DOCUMENTS 5,403,236 A 4/1995 Greig 5,702,789 A 12/1997 Fernandez-Kirchberger et al.

*Primary Examiner*—Alexander S. Thomas

(74) *Attorney, Agent, or Firm*—Hovey, Williams, Timmons & Collins

(57) ABSTRACT

A business form is provided which provides improved securement of a card inlaid within an opening of a surrounding ply. The card is inlaid within the opening whereby it is substantially coplanar to the ply, providing decreased thickness, and is temporarily held therein by a pair of elongated strips along respective and spaced edges of each opening and borders of each card, and also by patches applied intermittently between said strips and along other borders of each card. The application of the patches provides improved retention of the cards within their openings during processing such as printing, without substantially inhibiting the ability to print indicia on the back side of the cards intermediate the patches and the strips. The application of small, intermittent patches to hold the inlaid cards within the surrounding ply substantially increases the available area on the back side of the card while improving retention of the card during manufacturing.

16 Claims, 1 Drawing Sheet

INTEGRATED CARD FORM WITH INTERMITTENT SECUREMENT

BACKGROUND OF THE INVENTION

1. Field of the Invention

This invention concerns a business form which has one or a plurality of cards integrated within a surrounding ply, the card being held in position by intermittent and discrete tape segments. More particularly, the intermittent tape sections are positioned between continuous tape strips to inhibit deflection of the card relative to the surrounding ply.

2. Description of the Prior Art

Recent developments in business forms have led to improved options for manufacturers to provide more economical business forms which include a durable card carried by or as a part of a surrounding ply. Examples of such business forms are shown in U.S. Pat. Nos. 5,403,236 and 5,702,789, the disclosures of which are incorporated by reference. These forms enable the user to have a single ply form providing an opening into which a card of the same or different material is placed. In the case of the U.S. Pat. No. 5,403,236, the card may be secured either by application of adhesive around the opening so that the card overlaps the opening, or by applying two continuous, spaced and parallel tape strips along two edges of the opening so that the tape holds the card in position. With regard to the U.S. Pat. No. 5,702,789, the cards may share common boundaries within the form and be held by two continuous, spaced and parallel tape strips along the card boundaries with the surrounding form.

While these forms have provided the ability to integrate a card into a surrounding ply of a form so that for the majority of the form, only a single thickness is presented, there are circumstances where during manufacture, printing or use, the forms need to bend. Often, especially when the card is of a different material than the surrounding ply, the card deflects relative to the ply, and in some instances separates. This deflection and separation process becomes more acute as the speed of the form through the manufacturing, printing, or processing stages is increased, thus rapidly moving the form around rollers. Thus, there has developed a need for an economical means of securing the card to the surrounding ply more completely to resist deflection or separation without the necessity of overlap between the card and the surrounding ply.

SUMMARY OF THE INVENTION

These objects have largely been met by the business form of the present invention which provides not only continuous tape strips having adhesive which extend along two parallel, opposed margins of the card, but also intermittent application of tape patches with adhesive intermediate the two parallel strips so as to hold the card along margins extending between the spaced parallel strips. The intermittently applied intermediate tape segments are positioned to overlap a portion of the margin of the card intermediate the two parallel strips without completely covering the card, thus avoiding unnecessary bulk and thickness for the form, and permitting both sides of the form including the majority of the surrounding ply and the inlaid card to be imprinted with indicia. The tape is preferably thin cellophane or similar tape with an adhesive which remains with the tape rather than transferring to the card. The card may be of the same, or more preferably a different material, than the surrounding ply. The form itself may be provided in individual cut sheets or adjacent sheets may be joined along a line of weakening such as a perforation or score line to provide for fan folding of the joined sheets. The adjacent sheets may be provided as part of a roll in addition to fan folding.

DESCRIPTION OF THE PREFERRED EMBODIMENT

Figure 1:
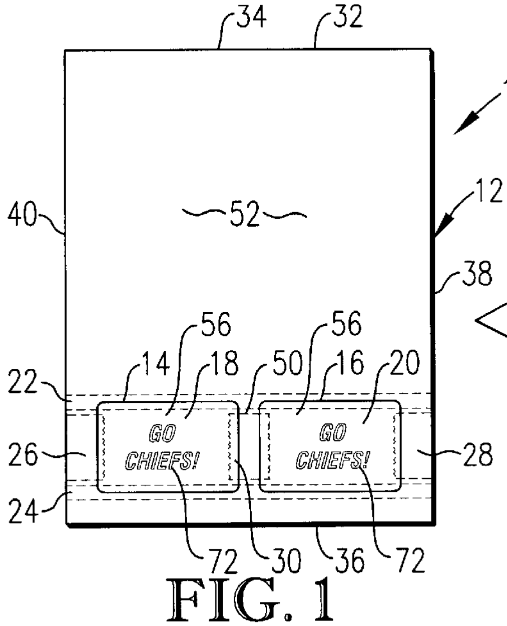
FIG. 1 is a front elevational view of the form of the present invention, showing the continuous tape strips and the intermittent intermediate tape patches in dotted lines.

Referring now to the drawing, FIG. 1 shows a business form 10 in accordance with the present invention wherein a ply 12 of paper or the like includes two openings 14 and 16 therein for the receipt of cards 18 and 20 respectively. The ply 12 may be a sheet of any suitable, preferably printable material, while the cards 18 and 20 may be of a heavier paper, cardstock or plastic. Both the ply 12 and the cards 18 and 20 may be imprinted with indicia thereon. The cards 18 and 20 are secured within the openings 14 and 16 by elongated, continuous, spaced parallel strips 22 and 24 and intermittent patches 26, 28 and 30.

Figure 2:
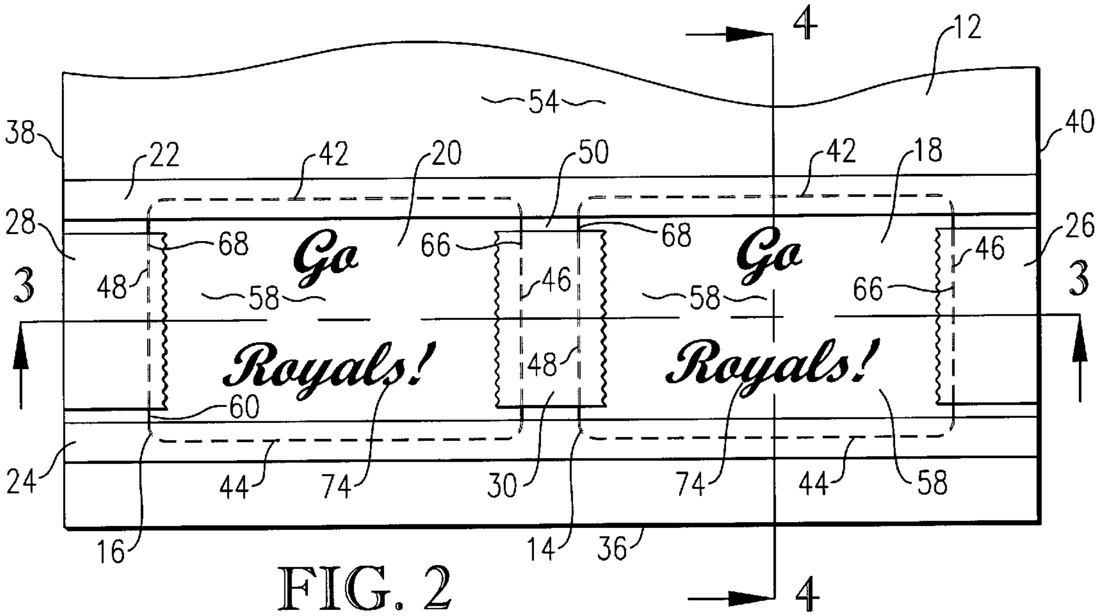
FIG. 2 is an enlarged fragmentary rear elevational view of the form of FIG. 1 showing the positioning of the intermittent intermediate tape patches along the side margins of the inlaid cards.

In greater detail, the ply 12 has a surrounding margin 32 which, as illustrated in FIG. 1, includes a top margin 34, a bottom margin 36 spaced therefrom and parallel thereto, and side margins 38 and 40 which are perpendicular to and extend between the top and bottom margins 34 and 36, although it may be appreciated that the margin 32 may be of any desired shape. Openings 14 and 16 are preferably die cut and are located interiorly of the surrounding margin 32 so that the ply 12 surrounds the openings. The openings 14 and 16 are most preferably substantially rectangular, each presenting a top edge 42, a bottom edge 44, and side edges 46 and 48, with the top edges 42 of the opening 14 being substantially co-linear with the top edge 42 of the opening 16 and the bottom edge 44 of the opening 14 being substantially co-linear with the bottom edge 44 of the opening 16. Further, the side edges 46 and 48 of the openings 14 and 16 are substantially parallel and in horizontal alignment across the ply as shown in FIG. 2. A barrier 50 separates the openings 14 and 16 one from another, so that each opening is discrete and not coextensive with any other opening or the surrounding margin 32. It may be appreciated, however, that multiple openings may be provided in any ply 12, so that the number of openings is not limited to the two illustrated herein. The ply 12 also presents a top surface 52 and a bottom surface 54.

The cards 18 and 20 may be of paper, cardstock, or plastic and are cut into a shape and size to correspond to and fit just within the openings 14 and 16, thereby avoiding any overlap of the cards 18 and 20 onto the ply 12. The cards 14 and 16 are thus separate from the ply 12, and of slightly smaller dimensions. The cards 14 and 16 are thus preferably of the same shape and positioned adjacent one another, although multiple cards can be positioned in multiple openings. Each card has a front side 56, a back side 58, and a perimeter 60 which includes top border 62, a bottom border 64 spaced and substantially parallel thereto, and side borders 66 and 68 which are parallel to one another and substantially perpendicular to the top and bottom borders 62 and 64.

Figure 4:
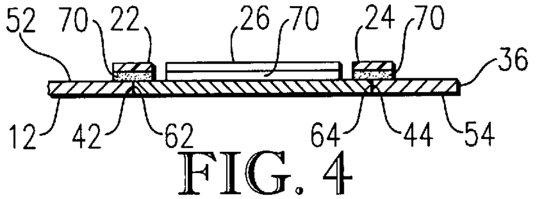
FIG. 4 is a vertical cross-sectional view taken along line 4—4 of FIG. 2 showing the two spaced parallel tape strips and the intermittent intermediate tape patch for holding a card within the surrounding ply, the thicknesses being exaggerated for clarity.

The cards 18 and 20 are held within the respective openings by strips 22 and 24 and intermittent patches 26,28 and 30. The strips 22 and 24 are preferably thin, elongated and continuous and provided by tapes of cellophane or similar synthetic resin material which is tough and tear resistant. The tape strips 22 and 24 are in parallel alignment as shown in FIGS. 2 and 4, and are positioned on the bottom surface 54 of the ply 12. The tape strips 22 and 24 are provided with adhesive 70 on one side thereof so that the adhesive is between the tape strips 22 and 24 and the bottom surface 54 of the ply 12 and the back side 58 of the card. Tape strip 22 extends over both the top edge 42 of the openings and the top border 62 of each of the cards 18 and 20, while the tape strip 24 extends over both the bottom edge 44 of the openings and bottom border 64 of each of the cards 18 and 20, thereby providing an adhesive securement between the top and bottom edges of the openings and the cards by two parallel, spaced, continuous strips of tape. The tape strips 22 and 24, being thin and spaced apart, do not substantially interfere with either the ability to imprint indicia 72 on the front side 56 or indicia 74 on the back side 58 of the cards 18 and 20.

In the present invention, the patches 26, 28 and 30 are preferably of somewhat wider cellophane or other tape than strips 22 and 24 so as to overlie and adhesively couple the ply 12 to the cards 18 and 20 along the side edges 46 and 48 of the openings 14 and 16 and the corresponding side borders 66 and 68 of the cards. The intermittent tape patches 26, 28 and 30 are discrete from one another and preferably in alignment between the tape strips 22 and 24 on the bottom surface 54 of the ply 12 and the back side of the cards 18 and 20. Tape patch 26 extends to the side margin 40 and across the side edge 46 and the side border 66 to overlie and adhere to a portion of the back side 58 of card 18. Tape patch 28 extends from the side margin 38 and across the side edge 48 and the side border 68 to overlie and adhere to a portion of the back side 58 of card 20. However, it may be appreciated that the tape patches 26 and 28 need not necessarily extend to the side margins 40 and 38, respectively, but may of a smaller length which simply spans the side borders 66 and 68 and the side edges 46 and 48 to attach the cards 18 and 20 to the ply 12. Tape patch 30 is positioned over and adheres to the bottom surface 54 of the barrier 50 to extend across the side border 68 of card 18 and side border 66 of card 20. The tape patches 26, 28 and 30 are thus positioned in substantial horizontal alignment as shown in FIG. 2 to hold the side borders 66 and 68 close to the side edges 46 and 48, respectively, but not only do not cover the top surface of the ply 12 but leaves open and uncovered substantial portions at the center of the back sides 58 of the cards 18 and 20.

Figure 5:
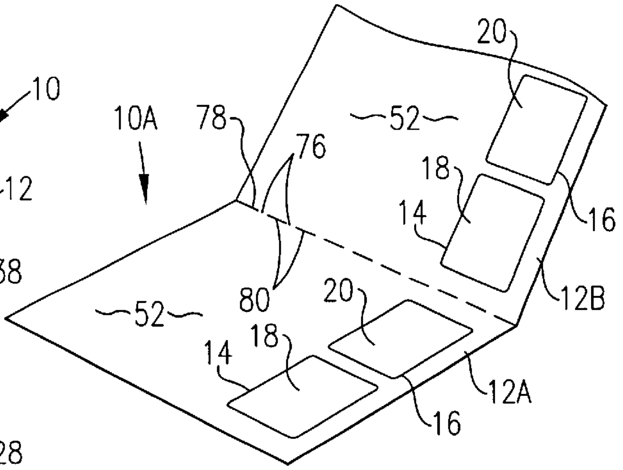
FIG. 5 is a fragmentary perspective view of an alternate embodiment of the invention wherein the form includes individual sheets joined along a side margin for providing continuous fan-folding capability.

An alternative embodiment of the form 10A is shown in FIG. 5, wherein the side margins 38 and 40 of adjacent plys 12A and 12B are connected by tabs 76 left along a line of weakness 78 created by perforations 80. This arrangement provides for continuous manufacture and fan-folding of the plys 12A and 12B, but in all other respects the form 10A is the same as described above. Alternatively, the forms 10A may be provided in continuous form on a roll, either with or without perforations.

Figure 3:
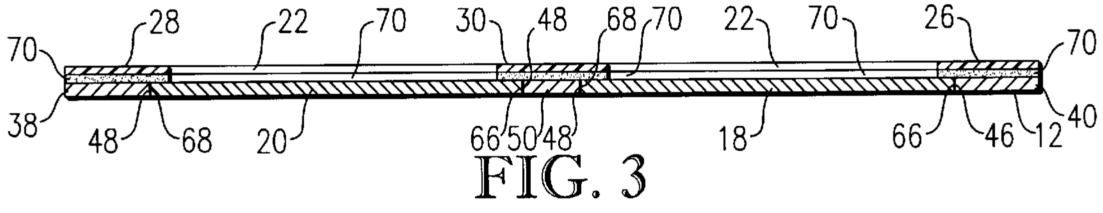
FIG. 3 is a vertical cross-sectional view taken along line 3—3 of FIG. 2 showing the tape and adhesive for securing the inlaid cards along their side margins within the surrounding ply, the thicknesses being exaggerated for clarity.

The form 10 of the present invention may be readily prepared by die cutting the openings 14 and 16 in the ply 12, removing the portion of the ply within the opening and placing therein cards 18 and 20, dimensioned complemental to the openings 14 and 16. Tape strips 22 and 24 are then continuously applied transversely across the bottom surface of the ply and the back sides 58 of the cards as described above. Further, tape patches 26,28 and 30 are applied at transversely spaced intervals as shown in FIGS. 2 and 3 and spaced to be discrete from and intermediate the tape strips 22 and 24 as shown in FIGS. 2 and 4. The tape patches and tape strips may be manually cut and placed, or applied by a machine. When the continuous form 10A of FIG. 5 is produced, the tape strips 22 and 24 may be continuous to extend across several plys, e.g. 12A, 12B, etc. The indicia may be imprinted on the cards and the surrounding plys either before or after the insertion of the cards into the openings and the application of the tape strips and tape patches, or both. As the form 10 bends during passage through a printer or typewriter, the cards resists separation or deflection from the surrounding ply 12 because the intermittent tape patches 26,28 and 30 couple and span the gap present between the cards 18 and 20 and the ply 12. The user may graps the card from the front side of form 10 and remove either card from the ply 12, with the adhesive remaining on the tape strips and tape patches so that the card is substantially free of adhesive.

Although preferred forms of the invention have been described above, it is to be recognized that such disclosure is by way of illustration only, and should not be utilized in a limiting sense in interpreting the scope of the present invention. The orientation of the cards, or their number or positioning within corresponding openings of the ply, and the shape of the cards and openings may be varied, or tractor feed strips applied to the continuous form 10A. Further, a film could be applied instead of tape strips and patches to secure the cards as illustrated. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. A business form comprising:

at least one card having a front side, a back side, and a perimeter having a top border, a bottom border, and first and second side borders;

a ply having a top surface, a bottom surface, and a surrounding margin, said ply including at least one opening interiorly spaced from said surrounding margin complementally configured for receipt of said card within said opening in substantially coplanar relationship to said ply;

first and second elongated tape strips adhesively connected to the back side and the bottom surface in spaced relationship and respectively overlying said top border and said bottom border; and first and second discrete tape patches positioned intermediate said first and second tape strips in spaced relationship from one another and adhesively connected to the back side and the bottom surface, said first and second tape patches respectively overlying said first and second side borders of said card.

2. A business form as set forth in claim 1, wherein said ply includes a second opening discrete from said one opening and interiorly spaced from said surrounding margin and a second one of said cards complementally sized to fit within said second opening, said first opening and said second opening being aligned whereby said first and second tape strips are continuous and the top and bottom borders of each of said cards are substantially co-linear.

3. A business form as set forth in claim 2, said ply including a barrier separating said first and second openings, and wherein said first tape patch overlies said barrier and said second side border of said second card.

4. A business form as set forth in claim 3, including a third tape patch positioned intermediate said first and second tape strips and adhering to said back side of the second card and the bottom surface.

5. A business form as set forth in claim 4, wherein said ply is a cut sheet having a top margin, a bottom margin substantially parallel thereto, and a pair of side margins substantially perpendicular to said top margin and bottom margin, and wherein said tape strips extend from one side margin to the other.

6. A business form as set forth in claim 5, wherein second and third tape strips extend interiorly along said back surface respectively from respective ones of said side margins.

7. A business form as set forth in claim 6, including indicia printed on said one card intermediate said first and second tape strips and intermediate said first and second tape patches.

8. A business form as set forth in claim 7, wherein said line of weakness is substantially perpendicular to said elongated tape strips.

9. A business form as set forth in claim 3, wherein said form includes a plurality of said plies interconnected along a portion of their respective surrounding margins by a line of weakness.

10. A business form as set forth in claim 1, wherein said card is provided of plastic and said ply is provided of paper.

11. A business form comprising:

a carrier ply including top surface, a bottom surface and a surrounding margin and first and second openings received within said margin, each of said openings having a top edge, a bottom edge oriented in spaced relationship to and substantially parallel to said top edge, and a pair of spaced-apart side edges extending substantially perpendicular to said top and bottom edges, said ply further including a barrier separating said first and second openings;

first and second cards complementally sized and configured respectively with said first and second openings, said cards each having front side and a back side and being received within said openings and positioned in substantially coplanar relationship to said carrier ply without overlapping onto said carrier ply; and means secured to the bottom surface of said ply and the back side of said cards for temporarily holding said cards within said openings, including first and second elongated strips oriented in spaced, substantially parallel relationship, one of said strips overlying the top edge of each of said openings on said back side and connected to said ply, the other of said strips overlying the bottom edge of each of said openings on said back side and connected to said ply, and further including first, second and third discrete and laterally spaced patches positioned intermediate said first and second elongated strips in overlying relationship to said side edges and coupling said cards to said ply therealong, said patches being positioned whereby a portion of said back side of each of said cards intermediate said strips and said patches is uncovered.

12. A business form as set forth in claim 11, wherein the strips and patches are tape.

13. A business form as set forth in claim 11, wherein the strips and patches are synthetic resin film.

14. A business form as set forth in claim 11, wherein the ply is a cut sheet.

15. A business form as set forth in claim 11, wherein the form includes a plurality of said plies interconnected along the margin of each by a line of weakness.

16. A business form as set forth in claim 11, wherein at least one of the patches overlies said barrier to connect a plurality of cards to said ply.

* * * * *